United States Patent
Maricq et al.

(10) Patent No.: US 6,592,642 B2
(45) Date of Patent: Jul. 15, 2003

(54) BRAKE DUST COLLECTION ASSEMBLY

(75) Inventors: Michel Matti Maricq, Grosse Ile, MI (US); Paul George Sanders, Milan, MI (US); Rena Hecht Basch, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/851,667

(22) Filed: May 9, 2001

(65) Prior Publication Data

US 2002/0166311 A1 Nov. 14, 2002

(51) Int. Cl.[7] .............................................. B01D 50/00
(52) U.S. Cl. ..................... 55/385.3; 55/385.1; 95/28; 95/57; 96/1; 96/15; 188/218 A; 188/218 XL
(58) Field of Search ............................ 55/385.1, 385.3; 95/28, 57; 96/1, 15; 188/218 A, 218 XL

(56) References Cited

U.S. PATENT DOCUMENTS

| | | | |
|---|---|---|---|
| 2,988,173 A | 6/1961 | Romine | |
| 3,647,164 A | 3/1972 | Smith | |
| 3,697,910 A | * 10/1972 | Tschabrun et al. | 188/164 |
| 4,093,038 A | * 6/1978 | Molin | 188/271 |
| 4,227,446 A | 10/1980 | Sone et al. | |
| 4,667,110 A | 5/1987 | Kariya | |
| 5,162,053 A | 11/1992 | Kowalski, Jr. | |
| 6,063,153 A | * 5/2000 | Kai | 55/385.1 |
| 6,126,722 A | * 10/2000 | Mitchell et al. | 95/57 |

* cited by examiner

*Primary Examiner*—Duane Smith
*Assistant Examiner*—Minh-Chau T. Pham
(74) *Attorney, Agent, or Firm*—Brooks & Kushman P.C.; Gregory P. Brown

(57) ABSTRACT

A vehicle brake assembly includes a brake rubbing interface operative to slow a vehicle when activated. The interface produces airborne brake dust particles when activated. A dust collector plate is positioned in close proximity to the brake rubbing interface to collect the brake dust. A charging circuit is operative to generate an electrostatic charge so that the brake dust is attracted to the charged collector plate.

16 Claims, 2 Drawing Sheets

BRAKE DUST COLLECTION ASSEMBLY

BACKGROUND OF THE INVENTION

1. Field of the Invention

The present invention relates to an electrostatic brake dust collection assembly in which a charged collector plate collects airborne brake dust particles adjacent a brake rubbing interface of a vehicle brake assembly.

2. Background Art

The present invention addresses problems associated with the generation of airborne brake dust particles from the friction at a brake rubbing interface of a vehicle braking system when the brakes are applied. These airborne brake dust particles sometimes accumulate on aluminum wheels, and have become a recurring customer complaint issue on certain vehicle lines. This debris can be very difficult for customers to remove from an aluminum wheel, and occasionally causes discoloration of the wheels.

Also, the airborne brake dust particles generated by friction brakes may contribute to the atmospheric particulate matter (PM) load, a pollution criteria monitored by the Environmental Protection Agency (EPA).

It has been determined by brake dynamometer and chassis rolls dynamometer tests that a significant percentage of brake wear is in the form of airborne particulates. Brake dynamometer testing has shown that typically 80–90% of the total amount of material worn away from the brake discs and pads is airborne. Currently, the emission of particles in the $PM_{10}$ (less than or equal to 10 $\mu$m diameter) range is regulated for tailpipe emissions at 80 mg/mile, but that value is scheduled to be decreased to 10 mg/mile. Also, the EPA has proposed regulations for PM 2.5($\leq$2.5 $\mu$m diameter) particles. It has been determined that brake particles range from 0.4 to $\geq$10 $\mu$m in aerodynamic diameter, with the mean diameter of 1–2 $\mu$m. Brake wear dust potentially contributes to airborne PM load under current and future standards, therefore it is particularly desirable to reduce the release of airborne brake particles, even if this type of emission is not regulated.

SUMMARY OF THE INVENTION

The present invention provides a method and apparatus for reducing airborne brake dust particles by means of electrostatic, magnetic or electromagnetic dust collection.

Specifically, the present invention provides a vehicle brake assembly including a brake rubbing interface operative to slow a vehicle when activated. The interface produces airborne brake dust particles when activated. A dust collector plate is positioned in close proximity to the brake rubbing interface to collect the brake dust. A field generating system (such as a magnet, electromagnet, or charging circuit which generates electrostatic charge) generates a field so that the brake dust is attracted to the collector plate(s). Preferably, a charging circuit is used to generate an electrostatic field.

In alternative embodiments, the collector plates are magnetic or electromagnetic, and the iron in the dust particles is attracted to the magnetic or electromagnetic collector plate to reduce airborne dust particles.

A method of collecting airborne brake dust from a vehicle brake assembly in accordance with the present invention includes the steps of: a) providing a dust collector plate in close proximity to a brake rubbing interface of the vehicle brake assembly; and b) charging the collector plate to electrostatically collect airborne brake dust generated at the rubbing interface.

Accordingly, an object of the invention is to provide a method and apparatus for reducing airborne brake dust particles by electrostatically, magnetically or electromagnetically collecting the airborne dust particles closely adjacent the rubbing interface of the brake assembly.

The above object and other objects, features, and advantages of the present invention are readily apparent from the following detailed description of the best modes for carrying out the invention when taken in connection with the accompanying drawings.

DETAILED DESCRIPTION OF THE PREFERRED EMBODIMENTS

During braking events, the rubbing or grinding action of a friction material (brake pad, lining, or shoe) against a disc or drum generates brake dust or particles. Laboratory evidence indicates that a significant number of these particles are electrically charged. The present invention provides an electrostatic brake dust collector which implements a charged collector to trap potentially airborne brake particles, thereby mitigating brake wear emissions and reducing the amount of brake dust accumulating on vehicle wheels.

Figure 1:
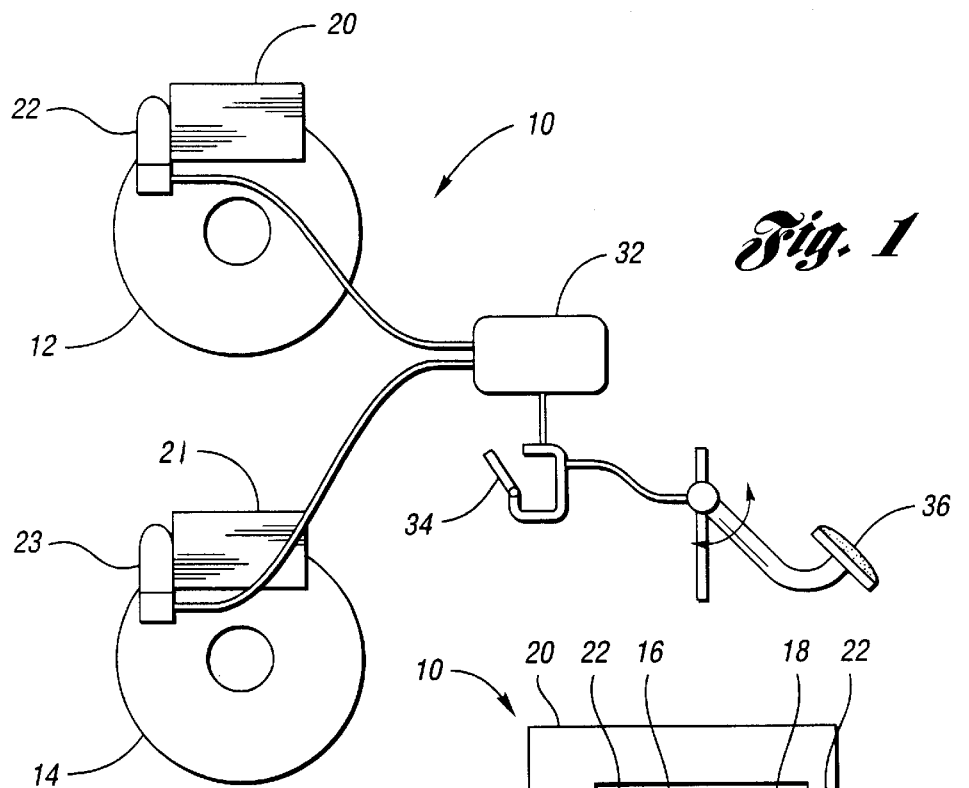
FIG. 1 shows a schematic of an electrostatic brake dust collection system as applied to disc brakes in accordance with the present invention.
Figure 2:
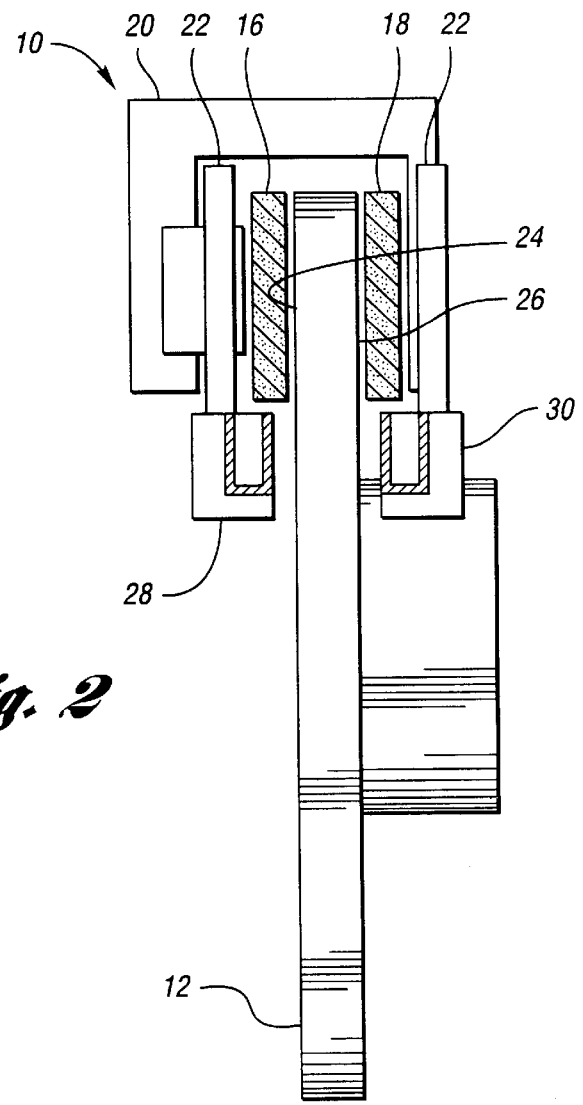
FIG. 2 shows a schematic vertical cross-sectional view of a disc brake and dust collection system corresponding with the embodiment of FIG. 1.

A vehicle brake assembly 10 is shown schematically in FIGS. 1 and 2. The brake assembly 10 includes brake rotors 12,14 which are engageable by brake pads 16,18 for slowing the rotors 12,14. The brake pads 16,18 are positioned within a caliper assembly 20. Dust collector plates 22,23 are provided in close proximity to the brake rubbing interfaces 24,26 to collect airborne brake dust. Receptacles 28,30 are provided beneath each collector plate 22, as shown in FIG. 2, respectively, for accumulating collected dust particles.

The collector plates 22,23 may be electrostatically charged or electromagnetically charged, or may include one or more permanent magnets. To electrostatically charge the plates 22,23, a voltage is applied to create an electrical potential of positive or negative polarity on each plate 22,23. Positively charged dust particles would be attracted to the negatively charged collector plates and the negatively charged dust particles would be attracted to the positively charged collector plates. Of course, the collector plates 22,23 need not be flat plates, but could be cylindrical or any other appropriate shape for the configuration of the brake assembly. Single plates are shown for clarity. In practice, multiple plate assemblies could be used. If the collector plates 22,23 are magnetic or electromagnetic, they will collect primarily iron dust particles, which is a significant fraction of the dust particles. Also, the non-iron particles may be entrained with iron particles and collected on the same magnetized surface.

As shown in FIG. 1, the caliper assemblies 20,21 are positioned over an edge of each brake rotor 12,14, respectively, and the collector plates 22,23 are positioned closely adjacent to a dust particle exit end of the caliper assemblies 20,21 for dust collection.

The charge circuit 32 is operative to charge the collector plates 22,23, and may also be operative to charge the particles themselves. A switch 34 is provided to activate the charging circuit 32 upon application of the brake pedal 36.

A scraper may be provided to remove dust from the collector plates 22,23 into the receptacles 28,30.

As shown, the collector plates 22,23 are mounted in close proximity to the brake rubbing interface 24,26 to either the caliper, anchor bracket, or other component of the brakes and chassis system. One or more collectors can be mounted at each brake on the vehicle. Alternatively, collector plates can be mounted adjacent to drum brakes.

The switch 34 which is used to activate charging of the collector plates could also be used to reverse polarity on the collector plates to expel dust into the receptacles 28,30. The dust receptacles or accumulators 28,30 will be designed such that emptying, cleaning and/or replacing could be done during routine maintenance or upon brake lining replacement.

Figure 3:
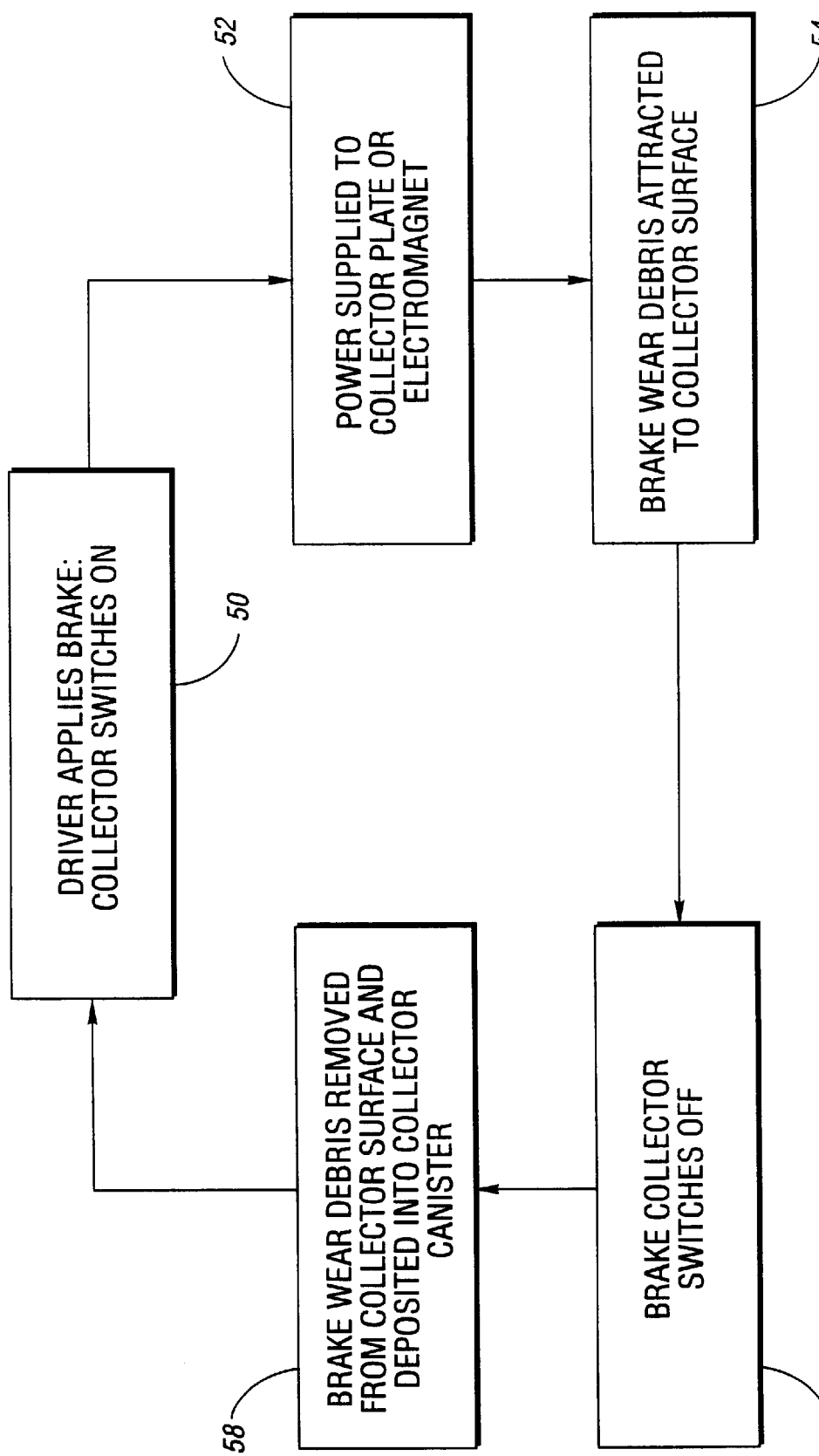
FIG. 3 shows a schematic flow chart of a method of brake dust collection in accordance with the invention.

FIG. 3 shows a schematic flow chart of the electrostatic dust collection system of the present invention. When a driver applies the brake (step 50), a switch activates the collectors by charging their electromagnetic or conductive plates (step 52). The friction of the pads 16,18 rubbing against the rotor 12 generates charged brake dust. This charged dust is attracted to the collector plates (step 54). When the driver releases the brake pedal, the power to the collector plates is switched off (step 56). Periodically, the brake debris attached to the collector plates is scraped or expelled from the collector into a receptacle (step 58).

If some fraction of the particles does not get charged (or develops an insufficient amount of charge) during the braking process, the debris can still be collected by electrostatic means. A corona discharge device may be used to charge particles immediately after creation by braking. The corona discharge device uses charged needles to ionize the air and thereby charge the neutral particles. This discharge would only be activated when the driver depresses the brake pedal. If electrical power constraints do not permit real-time powering of the discharge during braking, capacitors could be used to store the required electrical energy prior to braking, or the wheel rotation during braking could be used to generate the necessary current.

The magnetic and electrostatic methods of collection could be combined to improve collection efficiency. Collecting both magnetic and charged particles in sequence or in parallel could improve performance. Rotating magnetic rods could be used to collect the dust on one side and deposit it in a dust receptacle on the opposite side. This receptacle could employ a stronger permanent magnet which could be cleaned during routine maintenance or upon brake lining replacement.

While the best modes for carrying out the invention have been described in detail, those familiar with the art to which this invention relates will recognize various alternative designs and embodiments for practicing the invention without departing from the spirit and scope of the appended claims.

What is claimed:

1. A vehicle brake assembly comprising:
   a brake rubbing interface operative to slow a vehicle when activated, said interface producing airborne brake dust particles when activated;
   a dust collector plate positioned in close proximity to the brake rubbing interface to collect the brake dust; and
   a charging circuit operative to generate a field so that the brake dust is attracted to the collector plate.

2. The vehicle brake assembly of claim 1, further comprising a dust receptacle connected to the collector plate for accumulating said brake dust.

3. The vehicle brake assembly of claim 2, wherein said charging circuit is connected to the collector plate to electrostatically charge the collector plate.

4. The vehicle brake assembly of claim 2, wherein said charging circuit is operative to electrostatically charge the dust particles.

5. The vehicle brake assembly of claim 4, wherein said charging circuit includes a corona discharge device for charging the dust particles.

6. The vehicle brake assembly of claim 3, wherein the charging circuit is operatively connected to a vehicle brake pedal so that said electrostatic charge is generated only when the brake pedal is applied.

7. The vehicle brake assembly of claim 2, further comprising a scraper positioned adjacent the collector plate for scraping collected brake dust from the collector plate.

8. The vehicle brake assembly of claim 1, wherein said collector plate is electromagnetically charged.

9. A vehicle brake assembly comprising:
   a brake rubbing interface operative to slow a vehicle when activated, said interface producing airborne brake dust particles when activated;
   an electromagnetic brake collector plate positioned in close proximity to the brake rubbing interface to collect the brake dust; and
   a charging circuit connected to the collector plate for charging the collector plate.

10. A method of collecting airborne brake dust from a vehicle brake assembly comprising:
    providing a dust collector plate in close proximity to a brake rubbing interface of the vehicle brake assembly; and
    charging the collector plate to electrostatically collect airborne brake dust generated at the rubbing interface.

11. The method of claim 10, wherein said step of charging the collector plate occurs only when a vehicle brake is applied.

12. A vehicle brake assembly comprising:
    a brake rubbing interface operative to slow a vehicle when activated, said interface producing airborne brake dust particles when activated;
    a dust collector plate positioned in close proximity to the brake rubbing interface to collect the brake dust; and
    a field generating system operative to generate a field so that the brake dust is attracted to the collector plate.

13. The vehicle brake assembly of claim 12, wherein said field generating system comprises a magnet.

14. The vehicle brake assembly of claim 12, wherein said field generating system comprises an electromagnet.

15. The vehicle brake assembly of claim 12, wherein said field generating system comprises a charging circuit connected to the collector plate to electrostatically charge the collector plate.

16. The vehicle brake assembly of claim 12, wherein said field generating system comprises a charging circuit operative to electrostatically charge the dust particles.

* * * * *